United States Patent [19]

Schocher

[11] 4,335,638

[45] Jun. 22, 1982

[54] BAND-SAW MACHINE

[75] Inventor: Werner Schocher, Achern, Fed. Rep. of Germany

[73] Assignee: Gesellschaft für Schneidtechnik mit beschränkter Haftung, Achern, Fed. Rep. of Germany

[21] Appl. No.: 184,331

[22] Filed: Sep. 5, 1980

[30] Foreign Application Priority Data

Sep. 5, 1979 [DE] Fed. Rep. of Germany ....... 2935790

[51] Int. Cl.$^3$ ..................... B23D 55/04; B23D 55/08; B27B 13/10
[52] U.S. Cl. ...................................... 83/801; 83/821; 83/454
[58] Field of Search ................. 83/454, 794, 796, 800, 83/801, 820, 821

[56] References Cited

U.S. PATENT DOCUMENTS

| 3,752,022 | 8/1973 | Demurger | 83/801 |
| 3,789,717 | 2/1974 | Stolzer | 83/796 |
| 3,830,131 | 8/1974 | Wells | 83/820 |
| 3,875,839 | 4/1975 | Aizawa | 83/801 |
| 4,127,045 | 11/1978 | Blucher et al. | 83/820 |

Primary Examiner—Donald R. Schran
Attorney, Agent, or Firm—Spencer & Kaye

[57] ABSTRACT

In a band-saw machine including a machine stand defining a substantially horizontal workpiece support region, first and second clamping jaws mounted on the stand, with the first clamping jaw being mounted to move horizontally toward the second jaw for clamping a workpiece between the jaws, a machine head mounted above the support region, and supported for vertical displacement relative to the machine stand, an endless saw band mounted in the machine head to present a cutting reach extending above and across the support region, and two saw band guides disposed to respectively opposite sides of the workpiece support region, each associated with a respective clamping jaw and each holding the saw band in position to cut a workpiece, the guide associated with the first clamping jaw is mounted on that jaw to be displaced vertically without tilting relative thereto, a connecting member is connected between the guide associated with the first jaw and the machine head for transmitting the cutting reaction forces imposed by the saw band on that guide to the machine head the connecting member is mounted in the machine head for permitting the connecting member to move relative to the head in the direction of movement of, and together with, the first clamping jaw, and the first clamping jaw is dimensioned to extend toward the machine head at least to the maximum height of a workpiece which the machine is arranged to cut.

5 Claims, 2 Drawing Figures

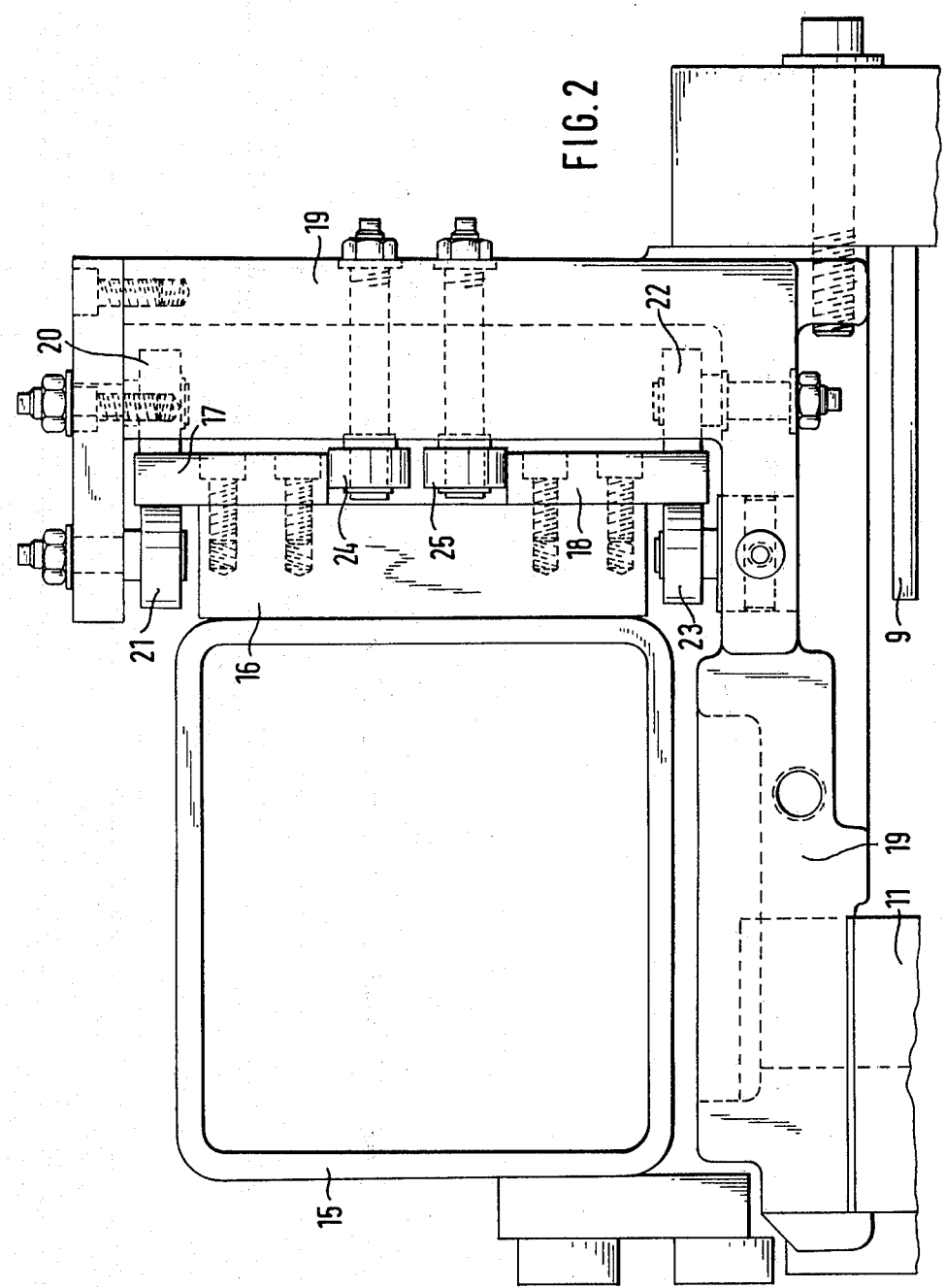

BAND-SAW MACHINE

BACKGROUND OF THE INVENTION

The present invention relates to a band-saw machine of the type composed of a workpiece bench provided on a stand to hold a workpiece between clamping jaws and a machine head carrying an endless saw band and moveable relative to the stand for feeding the saw band into the workpiece.

Such a band-saw machine is disclosed, for example, in FRG Pat. No. 2,159,580 and counterpart U.S. Pat. No. 3,789,717. In this known band-saw machine the machine head is pivotably articulated to the machine stand and the clamping jaw nearer to the pivot mounting is displaceable, as is the saw band guide allocated thereto. The other clamping jaw is fixed to the frame, while the saw band guide allocated to this clamping jaw is fixed in position on the machine head.

This known band-saw structure solves the problem of guaranteeing adaptation of the displaceable band guide to the adjustable clamping jaw to facilitate handling, for which purpose the displacement movement of the band guide is synchronized with the adjusting movement of the displaceable clamping jaw.

For large workpiece cross sections as a rule, band saws with the saw head articulated pivotally on the machine frame are not used, but instead the machine head is arranged horizontally to be vertically displaceable in relation to the machine stand, either hydraulically or via setting spindles of column form. If the synchronization between the displaceable clamping jaw and the saw band guide allocated to it, as disclosed in the above-cited patents, is transferred to such band saws, then the carriage carrying the displaceable band guide and guided displaceably on the machine head must be very long, leading to corresponding tilting moments and vibration stresses, and therefore again compelling correspondingly massive and rigid formation of the carriage and its guide.

SUMMARY OF THE INVENTION

It is an object of the invention to support the displaceable band guide of such a machine so that, irrespective of the setting of the displaceable clamping jaw as a function of the workpiece, the synchronized setting of the displaceable band guide takes place in a manner which always guarantees constant supporting directly beside the workpiece, without the need of heavy, displaceably guided components for this purpose for bringing the saw band guide to the workpiece on the machine head.

This and other objects are achieved, according to the invention, in a band-saw machine including a machine stand defining a substantially horizontal workpiece support region, first and second clamping jaws mounted on the stand, with the first clamping jaw being mounted to move horizontally toward the second jaw for clamping a workpiece between the jaws, a machine head mounted above the support region, means supporting the machine head for vertical displacement relative to the machine stand, an endless saw band mounted in the machine head to present a cutting reach extending above and across the support region, and two saw band guides disposed to respectively opposite sides of the workpiece support region, each associated with a respective clamping jaw and each holding the saw band in position to cut a workpiece, by the provision of: first mount means connected between the first clamping jaw and the saw band guide associated therewith for permitting the associated guide to be displaced vertically without tilting relative to the first jaw; connecting means extending between the guide associated with the first jaw and the machine head for transmitting the cutting reaction forces imposed by the saw band on that guide to the machine head; and second mount means connected the connecting means and the machine head for permitting the connecting means to move relative to the head in the direction of movement of, and together with, the first clamping jaw; and by dimensioning the first clamping jaw to extend toward the machine head at least to the maximum height of a workpiece which the machine is arranged to cut.

Due to the fact that the displaceable band guide is guided vertically on the displaceable clamping jaw, the synchronization between displaceable clamping jaw and band guide allocated to it occurs practically of its own accord, without special setting means being needed for this purpose. Due to the fact that the displaceable band guide is supported from above directly against the machine head, there is no need for lever arms for the mounting for the band guide in relation to the machine head, placed transversely of the direction of the cutting force acting upon the band guide, so that here again construction expense is considerably reduced. It is merely necessary to lengthen the displaceable clamping jaw upwardly so that it can form a guide column for the adjustable band guide. The vertical displaceability of the band guide on the displaceable clamping jaw can be achieved in one of the forms known in this respect.

In accordance with preferred embodiments of the invention, in a machine equipped with a fixed clamping jaw, the saw band guide associated with the fixed clamping jaw is also mounted in a vertically displaceable manner on its associated clamping jaw.

According to the further preferred embodiments of the invention, the movement of the displaceable guide on the machine head is synchronized with the movement of the displaceable clamping jaw. This prevents tilting stress upon the pressure member, so that its displaceable guide on the machine head can be correspondingly formed in a more simple manner and can be given relatively small dimensions.

By way of example, the synchronization can be effected by transmitting the rotating movement of a threaded spindle which drives the clamping jaw through a flexible shaft to a setting spindle for the upper end of the supporting member.

Finally construction of a machine in accordance with the invention provides the possibility of arranging a measuring device in the supporting member to ascertain the occurring supporting force for the saw band guide. Thus, in particular, the saw blade can be protected against overloading and the feed motion can be optimally adjusted.

BRIEF DESCRIPTION OF THE DRAWING

FIG. 2 is a cross sectional view along the section line II—II of FIG. 1.

DESCRIPTION OF THE PREFERRED EMBODIMENTS

Figure 1:
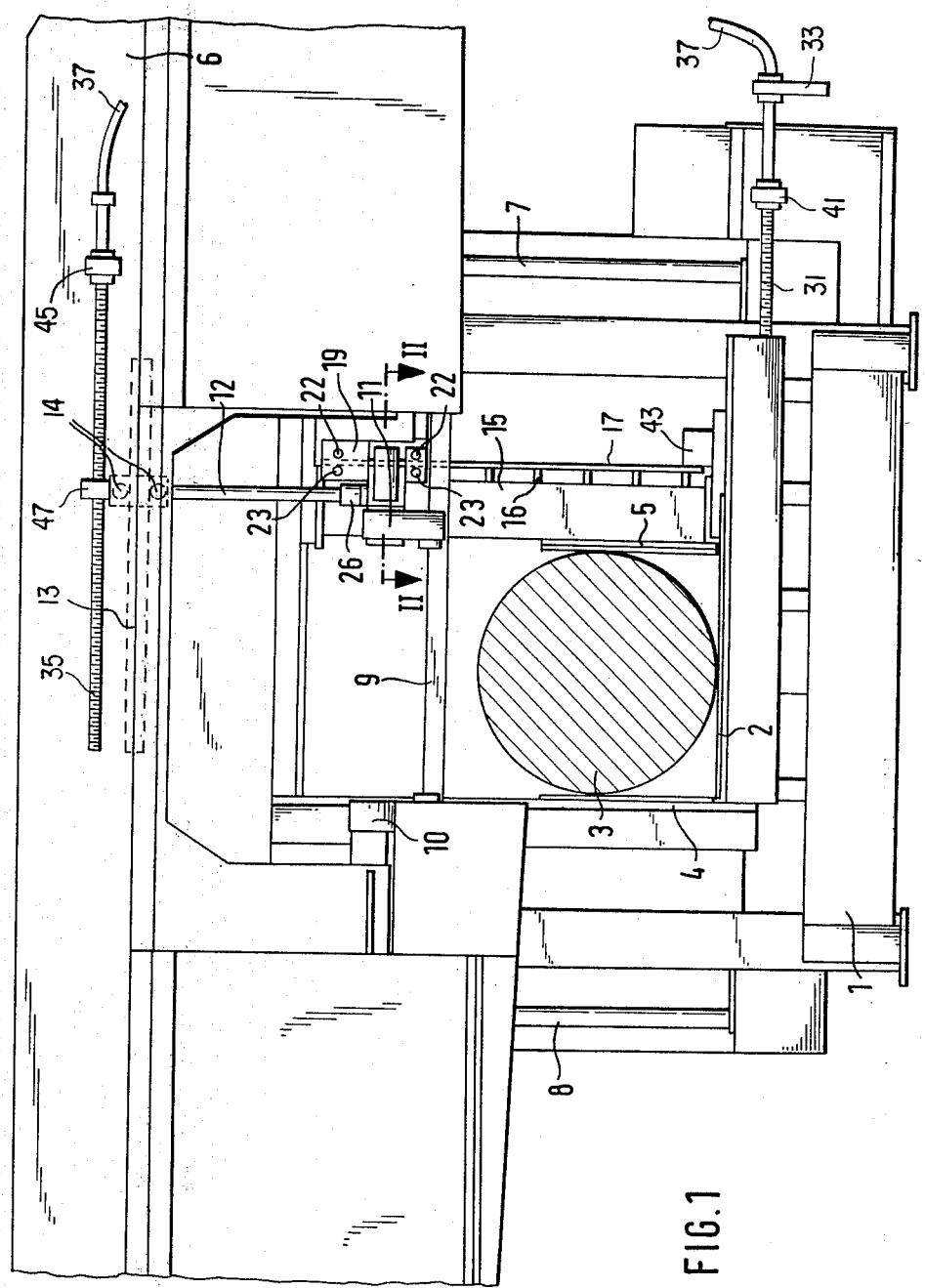
FIG. 1 is a side elevational view of a band-saw machine equipped with a preferred embodiment of the invention.

FIG. 1 shows a machine stand 1 carrying a workpiece bench 2 on which a workpiece 3 is clamped between clamping jaws 4 and 5. The clamping jaw 4 is fixed to bench 2 while the clamping jaw 5 is displaceable horizontally in a known manner by means of spindles arranged on the machine frame.

A machine head 6 is mounted on the machine stand 1 to be vertically displaceable thereon, the vertical displacement being affected, for example, by means of vertically disposed cylinder-piston units, the piston rods 7 and 8 of which are secured on the machine frame, and the cylinders of which are secured in the machine head 6. A saw band 9 is mounted in the machine head 6 to circulate around return wheels or rollers (not shown) arranged to the right and left of the cutting region. In the region of the clamping jaws 4 and 5 this saw band is guided by saw band guides 10 and 11 which, on the one hand, twist the saw band 9 into the vertical cutting plane and, on the other hand, absorb cutting forces acting on the saw band at locations directly beside the workpiece.

The saw band guide 10 is fixed directly to the machine head 6 and the saw band guide 11 is mounted to be moveable horizontally with, and vertically displaceable relative to the clamping jaw 5. Cutting reaction forces imposed on guide 11 are transmitted to head 6 via a connecting and pressure transmitting member 12 which in turn is horizontally displaceable in the machine head 6 in that the upper end of member 12 is supported, for example by means of rollers 14, by a guide rail 13 along which it can move. In this way the saw band guide 11 directly accompanies the horizontal movement of the clamping jaw 5. To ensure that the upper end of the member 12 is displaced precisely in unison with the clamping jaw 5 and cannot deviate laterally when vertical loadings occur, member 12 can be positively corrected, at its upper end, to a drive coupled to the drive for moveable clamping jaw 5. Thus, for example, as shown in FIG. 1, if jaw 5 is displaced by the action of one or several threaded rods 31 each driven via a belt or chain 33, member 12 can be connected to be positively driven at its upper end by rotation of a threaded rod 35 connected to rod 31 via a flexible shaft 37 to rotate in unison therewith. Rod 35 has the same thread pitch as, but opposite thread direction from, rod 31. Rod 31 is held, by means of snap rings, for example, in a bearing 41 mounted on machine stand 1 to be rotatable but axially immoveable relative to the bearing and is on threaded engagement with rotary threads in a block 43 fixed to clamping jaw 5. Similarly, rod 35 is held in a bearing 45 mounted in machine head 6 to be rotatable, but axially immoveable relative that bearing and is in threaded engagement with mating threads in a block 47 fixed to member 12 either directly or via a carriage supporting rollers 14. With this arrangement, each displacement of jaw 5, produced by rotation of rod 31, produces an identical displacement of the upper end of member 12 by rotation of rod 35.

FIG. 2 shows more precisely how the saw band guide 11 is guided vertically on the clamping jaw 5. From this it can be seen that the clamping jaw 5 is lengthened upwardsly a vertical column 15 in the form of a hollow rectangular section. On the side remote from the workpiece 3 the column 15 carries horizontal flanges 16 arranged one above the other and to which vertical guide strips 17 and 18 are secured. A mount 19 for the saw band guide 11 is guided non-tiltably on the guidestrips 17 and 18 by means of pairs of rollers 20 to 25, with the rollers of each pair being arranged one above the other.

In place of the form of construction illustrated, it is of course also possible to make the saw band guide 10 vertically displaceable on the clamping jaw 4 in conformity with the saw band guide 11. In this case it is not necessary to support the member associated with guide 10 and corresponding to member 12 displaceably on the machine head 6. Rather this member can then be connected firmly at its upper end with the machine head 6.

The arrangement in accordance with the invention provides in a simple manner the possibility of fitting a pressure measuring device 26 in the member 12, by means of which it is possible to ascertain the reaction force being exerted through the saw band guide 11 by the saw band 9. The resulting measurement can be utilized in a known manner to control the feed rate for the saw band 9 and to protect the saw band against overloading. Any known pressure gauge can be used as device 26.

It is to be understood that the above description of the present invention is susceptible to various modifications, changes and adaptations, and the same are intended to be comprehended within the meaning and range of equivalents of the appended claims.

What is claimed is:

1. In a band-saw machine including a machine stand defining a substantially horizontal workpiece support region, first and second clamping jaws mounted on the stand, with the first clamping jaw being mounted to move horizontally toward the second jaw for clamping a workpiece between the jaws, a machine head mounted above the support region, means supporting the machine head for vertical displacement relative to the machine stand, an endless saw band mounted in the machine head to present a cutting reach extending above and across the support region, and two saw band guides disposed to respectively opposite sides of the workpiece support region, each associated with a respective clamping jaw and each holding the saw band in position to cut a workpiece, the improvement comprising:

first mount means connected between said first clamping jaw and said saw band guide associated therewith for permitting said associated guide to be displaced vertically without tilting relative to said first jaw;

connecting means extending between said guide associated with said first jaw and said machine head for transmitting the cutting reaction forces imposed by the saw band on that said guide to said machine head; and second mount means connected between said connecting means and said machine head for permitting said connecting means to move relative to said head in the direction of movement of, and together with, said first clamping jaw; and wherein said first clamping jaw is dimensioned to extend toward said machine head at least to the maximum height of a workpiece which said machine is arranged to cut.

2. An arrangement as defined in claim 1 wherein said second clamping jaw is fixed relative to said machine stand and said machine further comprises:

third mount means connected between said second clamping jaw and said saw band guide associated therewith for permitting said associated guide to be displaced vertically without tilting relative to said second jaw; and second connecting means extending between said guide associated with said second jaw and said machine head and fixed to said machine head for transmitting the cutting reaction forces imposed by the saw band on that said guide to said machine head.

3. An arrangement as defined in claim 1 further comprising displacement means connected to cause said connecting means to move in synchronism with said first clamping jaw.

4. An arrangement as defined in claim 3 further comprising drive means connected for moving said first jaw horizontally toward said second jaw, said drive means comprising a first threaded rod which is rotatably mounted and connected to impart such movement to said first jaw as a function of its rotation, and said displacement means comprise a second threaded rod which is rotatably mounted and connected to said connecting means for imparting movement thereto in the direction of movement of said first jaw, and a flexible jaw connected between said first and second rods for rotating said second rod in a manner to cause said connecting means to move in unison with said first jaw.

5. An arrangement as defined in claim 1, 2, 3 or 4 further comprising a pressure sensing device operatively associated with said connecting means for providing an indication of the reaction force imposed by the saw band on the saw band guide associated with said first jaw.

* * * * *